United States Patent
Namm et al.

(10) Patent No.: US 12,353,204 B2
(45) Date of Patent: Jul. 8, 2025

(54) SYSTEM, DEVICE AND METHOD FOR CONTROLLING AN UNCREWED AERIAL VEHICLE AT PUBLIC SAFETY INCIDENTS

(71) Applicant: MOTOROLA SOLUTIONS, INC., Chicago, IL (US)

(72) Inventors: Joseph C. Namm, Chicago, IL (US); Nicholas G. Cafaro, Chicago, IL (US); Melanie A. King, Chicago, IL (US); Jimmy Zong, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 449 days.

(21) Appl. No.: 17/565,568

(22) Filed: Dec. 30, 2021

(65) Prior Publication Data

US 2023/0213932 A1  Jul. 6, 2023

(51) Int. Cl.
 *G05D 1/00* (2024.01)
 *H04W 4/90* (2018.01)

(52) U.S. Cl.
 CPC ......... *G05D 1/0016* (2013.01); *G05D 1/0022* (2013.01); *G05D 1/0055* (2013.01); *G05D 1/0088* (2013.01); *H04W 4/90* (2018.02)

(58) Field of Classification Search
 None
 See application file for complete search history.

(56) References Cited

U.S. PATENT DOCUMENTS

| | | | |
|---|---|---|---|
| 9,471,059 B1 * | 10/2016 | Wilkins | G05D 1/0016 |
| 9,977,429 B2 | 5/2018 | Lee et al. | |
| 9,996,082 B2 | 6/2018 | Glatfelter et al. | |
| 10,203,701 B2 | 2/2019 | Kurdi et al. | |
| 10,216,185 B2 | 2/2019 | Kotlyarov | |
| 10,970,928 B2 | 4/2021 | Jin et al. | |
| 2018/0082682 A1 * | 3/2018 | Erickson | G10L 15/30 |
| 2018/0327091 A1 * | 11/2018 | Burks | B64U 50/13 |
| 2019/0189125 A1 | 6/2019 | Van Os et al. | |
| 2019/0204836 A1 * | 7/2019 | Rezvani | G08B 13/1965 |
| 2020/0004235 A1 * | 1/2020 | Nocon | G05D 1/0033 |
| 2020/0258028 A1 | 8/2020 | Pohl et al. | |
| 2020/0351623 A1 * | 11/2020 | Eisner | H04W 4/80 |
| 2021/0080946 A1 | 3/2021 | Villa | |

FOREIGN PATENT DOCUMENTS

| | | |
|---|---|---|
| WO | 2019104554 A1 | 6/2019 |
| WO | 2020154996 A1 | 8/2020 |
| WO | 2020197418 A1 | 10/2020 |

* cited by examiner

*Primary Examiner* — Abby J Flynn
*Assistant Examiner* — Bakari Underwood
(74) *Attorney, Agent, or Firm* — PERRY + CURRIER INC.

(57) ABSTRACT

The present specification provides systems, devices and methods for controlling an uncrewed aerial vehicle (UAV) at a public safety incident. An example method contemplates placing a UAV in a shadow mode that follows a firefighter's movements throughout the PSI while monitoring voice activity while the UAV performs tasks such as sending images from a camera to a central server. Potential voice commands are extracted from the voice activity and associated with tasks being performed by the UAV. A machine learning dataset is built from those associations such that at future incidents the UAV can operate in a freelance mode based on detected voice commands or other contextual factors.

20 Claims, 6 Drawing Sheets

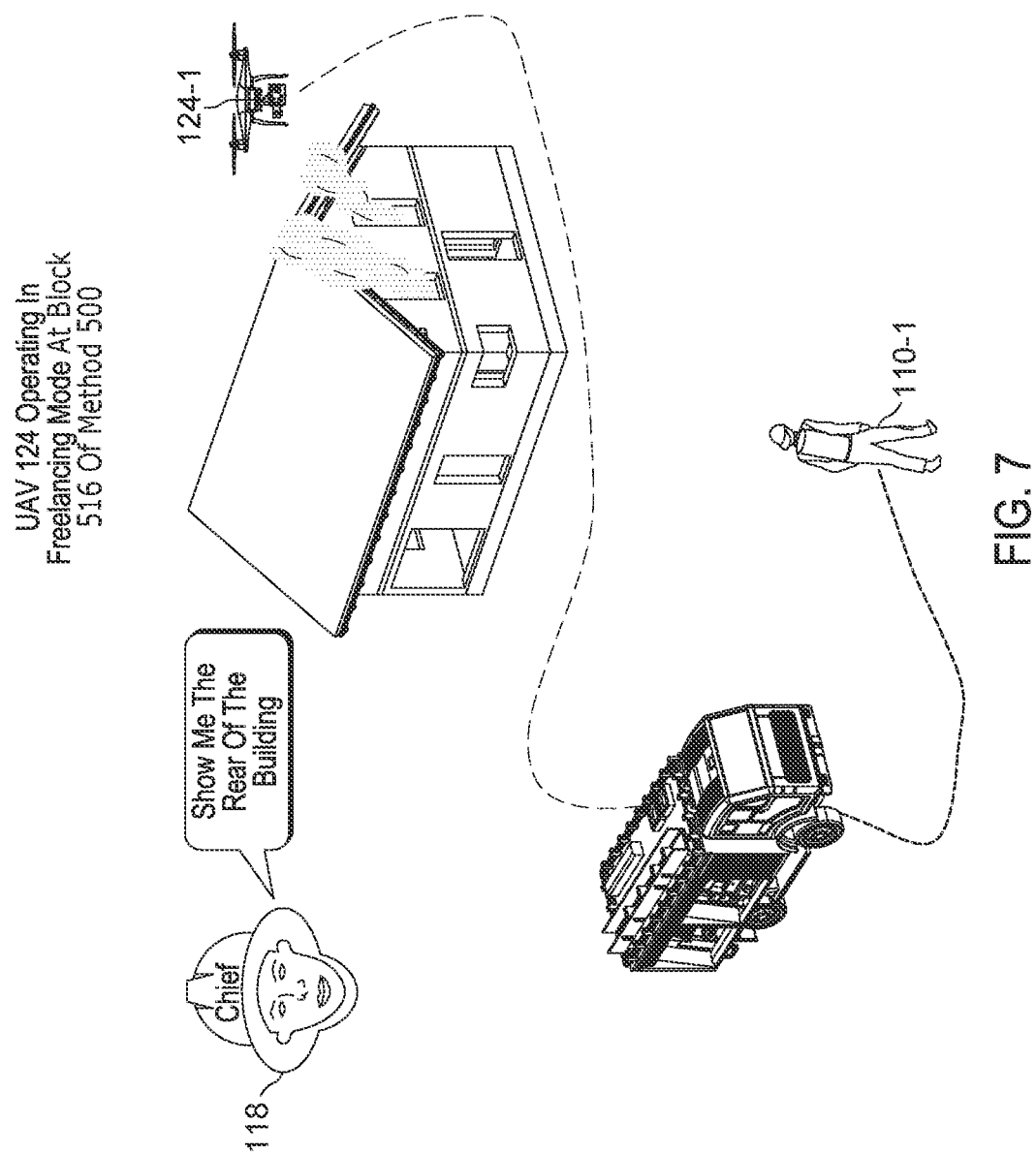

SYSTEM, DEVICE AND METHOD FOR CONTROLLING AN UNCREWED AERIAL VEHICLE AT PUBLIC SAFETY INCIDENTS

BACKGROUND

Public safety incidents such as fires require rapid, professional and effective responses to mitigate human injury and property damage. Technological enhancements can further improve outcomes of public safety incidents, but many limitations remain.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 7 is a graphical representation of a UAV at a public safety incident in the freelance mode of FIG. 6.

Figure 1:
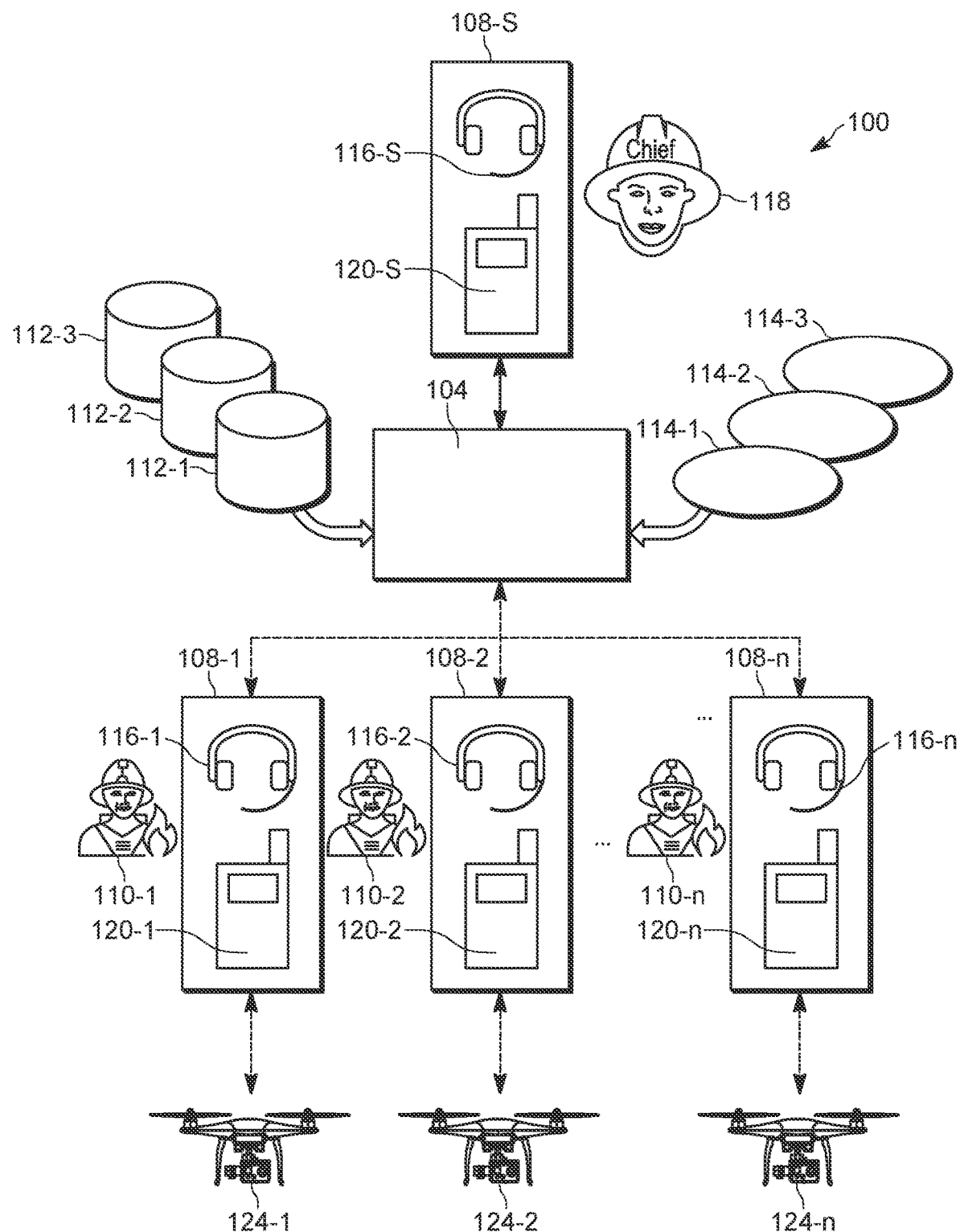
FIG. 1 is a block diagram representing a system for controlling at least one uncrewed aerial vehicle (UAV) at public safety incidents.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Public safety incidents (PSI) encompass a broad category of incidents including fires, vehicle accidents, search and rescue, shootings and acts of terrorism. Emergency services personnel (ESP) including fire fighters, police and paramedics are the first responders to such PSIs, they are the front line workers who are tasked with professionally and efficiently bringing a particular PSI under control to mitigate human injury and loss of property. Technology affords many types of equipment for ESP to do their job well. Uncrewed Aerial Vehicles (UAVs) are an increasingly common piece of equipment to support ESPs, often in the form of providing real time video surveillance of a PSI to help ESP understand the full context of a given situation and assist in prioritization, coordination and task allocation amongst ESP. However, the effort required to control the UAVs becomes another resource drain especially when one of the ESP may be required to control the UAV. For example, in the context of firefighting, a firefighter is already wearing bulky equipment and must stay alert and focused on the ever-present chaos of the fire. The benefits of UAV surveillance of the fire may be completely lost if the firefighter cannot otherwise focus on performing firefighting tasks at hand. Indeed, controlling the UAV may become a dangerous distraction making the PSI even worse. UAV control thus remains a serious barrier to deploying effective UAV surveillance and other types of UAV tasks at a PSI. Thus, there exists a need for an improved technical method, device, and system for controlling uncrewed aerial vehicle (UAVs) at public safety incidents.

An aspect of the present specification provides a communication system, comprising a plurality of radio voice communication devices for performing transmission and reception of first responder voice communications during a current public safety incident; an unmanned aerial vehicle (UAV) having an integrated communication device for monitoring the voice communications; and a processing unit for controlling the UAV and providing audio and voice analytics to detect and learn voice commands and associate the learned voice commands with UAV tasks assigned during the current public safety incident. In the system, the learned voice commands and associated UAV tasks for the current public safety incident are processed for predictive analytics for automated control of the UAV at future public safety incidents using voice commands detected at the future incident.

The predictive analytics may include weighting the UAV tasks, combining UAV tasks that can be performed together or prioritizing UAV tasks and updating the weighting for use in future incident UAV responses.

The processing unit may further perform a radio frequency (RF) survey via the UAV communication device to identify personnel based on their unique radio ID and associate public safety (PS) commands with UAV tasks associated with the identified personnel and incident type.

The UAV may stream video of operations from a plurality of areas of the incident in conjunction with detected first responder voice commands.

The processing unit may add captions to UAV video that is not synchronized with the first responder voice command to identify potential anomalies, such as a time discrepancy between when the command was issued and when the task is performed.

The processing unit may detect a voice command at a future incident and augments UAV tasks based on the detected command.

The processing unit may detect a location by understanding a physical location where a voice command originated and assessing a similar voice command from a nearby location.

The processing unit may further filter out commands that the UAV cannot perform and substitute a task that the UAV can perform related to the command.

The acquired data may be transferred to first responders based on first responder role and incident type.

Another aspect of the specification provides a method for controlling a UAV at a public safety incident, comprising: deploying a UAV at an incident scene, the UAV performing pre-defined tasks based on incident type: building a dataset of UAV tasks based on detected voice commands and incident type; performing predictive analytics on the tasks for application at a future incident using the dataset; weighting and combining tasks based on predetermined parameters; and automatically performing predicted tasks at the future incident based on incident type. The method may further comprise using a machine learning system to perform the weighting and combining.

The above-mentioned aspects will be understood by the discussion below in relation to certain non-limiting example embodiments. Such example embodiments are described with reference to certain systems, devices, methods and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, a special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause operational blocks to be performed on the computer or other programmable apparatus to produce a computer implemented process such that the instructions, which execute on the computer or other programmable apparatus, provide blocks for implementing the functions/acts specified in the flowchart and/or block diagram block or blocks. It is contemplated that any part of any aspect or embodiment discussed in this specification can be implemented or combined with other aspects or embodiments discussed in this specification.

Various advantages and features consistent with the present specification will become apparent from the following description with reference to the drawings.

Referring now to FIG. 1, a system for controlling an uncrewed aerial vehicle (UAV) at a public safety incident (PSI) is indicated generally at 100. The locus of the system 100 is a central server 104 that is connectable via a communication link to at least one communication device 108-1, 108-2 . . . 108-*n*. (Collectively, the communication devices 108-1, 108-2 . . . 108-*n* will be referred to as communication devices 108, and generically, as communication device 108. This nomenclature is used elsewhere herein.) Each device 108 may be assigned, even temporarily, to a respective firefighter 110. The central server 104 also connects to at least one supervisory communication device 108-S, which is substantially the same as each communication device 108, except that device 108-S is used by supervisory personnel, such as a fire chief 118, and is used to communicate commands that coordinate activities amongst firefighters 110 and to receive and display images of a PSI from the UAVs.

While the present embodiment refers to firefighters 110 and fire chief 118, it is to be understood that firefighting is merely one type of emergency service that can benefit from the present specification, and that police officers and paramedics or other personnel may benefit. Regardless, it is to be understood that the technical benefits of this specification are agnostic to the personnel that are associated with each device 108.

The central server 104 also maintains within local static memory at least one dataset 112 and at least one application 114. Application 114 is executable on a processor within server 104 and the at least one dataset 112 is accessible to at least one of the executing applications 114. These aspects of central server 104 will be discussed in greater detail below.

Each communication device 108 comprises a headset 116 and a two-way radio unit 120. Headset 116 is a form of input/output device connected to unit 120 to allow for providing voice communication to a respective unit 120 and to produce audio signals that can be heard.

(From further reading of this specification, it will become understood to a person of skill in the art that in variants of system 100, headset 116 is not strictly necessary and that other means of communicating between unit 120 and server 104 are contemplated. Additionally, there may be only one headset 116, such as headset 116-S worn by fire chief 118. By the same token, in other variants which will also become apparent from further reading of this specification, that communication device 108 associated with a specific firefighter 110 may be obviated altogether when, for example, a given UAV 124 is configured to use image recognition to identify and follow a given firefighter 110.)

Each unit 120 is configured to communicate with server 104 and also configured to communicate via a wireless link to a respective uncrewed aerial vehicle 124 (also referred to as UAV 124). Units 120 or server 104 can issue or relay control commands to UAVs 124, the details of such commands will be discussed in greater detail below. Each UAV 124 is also equipped with a camera for capturing still images or video images and relaying those images back to unit 120 which in turn can relay such images to server 104. (Herein, the use of the term "images" on its own is used interchangeably to refer to both still and video images and can include audio tracks captured with those images.) In other embodiments, UAVs 124 may also be equipped with other peripherals in addition, or in lieu of, a camera, such as temperature and gas sensors, a grasping mechanism for picking up, holding and releasing objects. A person skilled in the art will appreciate other possible peripherals and how they can be controlled using this specification. Note that while system 100 shows a plurality of UAVs 124, a variant of system 100 contemplates having only a single UAV 124.

Units 120 can each include a video display to view images captured by UAV 124. Notably, unit 120-S located within supervisory communication device 108-S includes a display so that the fire chief 118 can monitor image feeds from each UAV 124.

Figure 2:
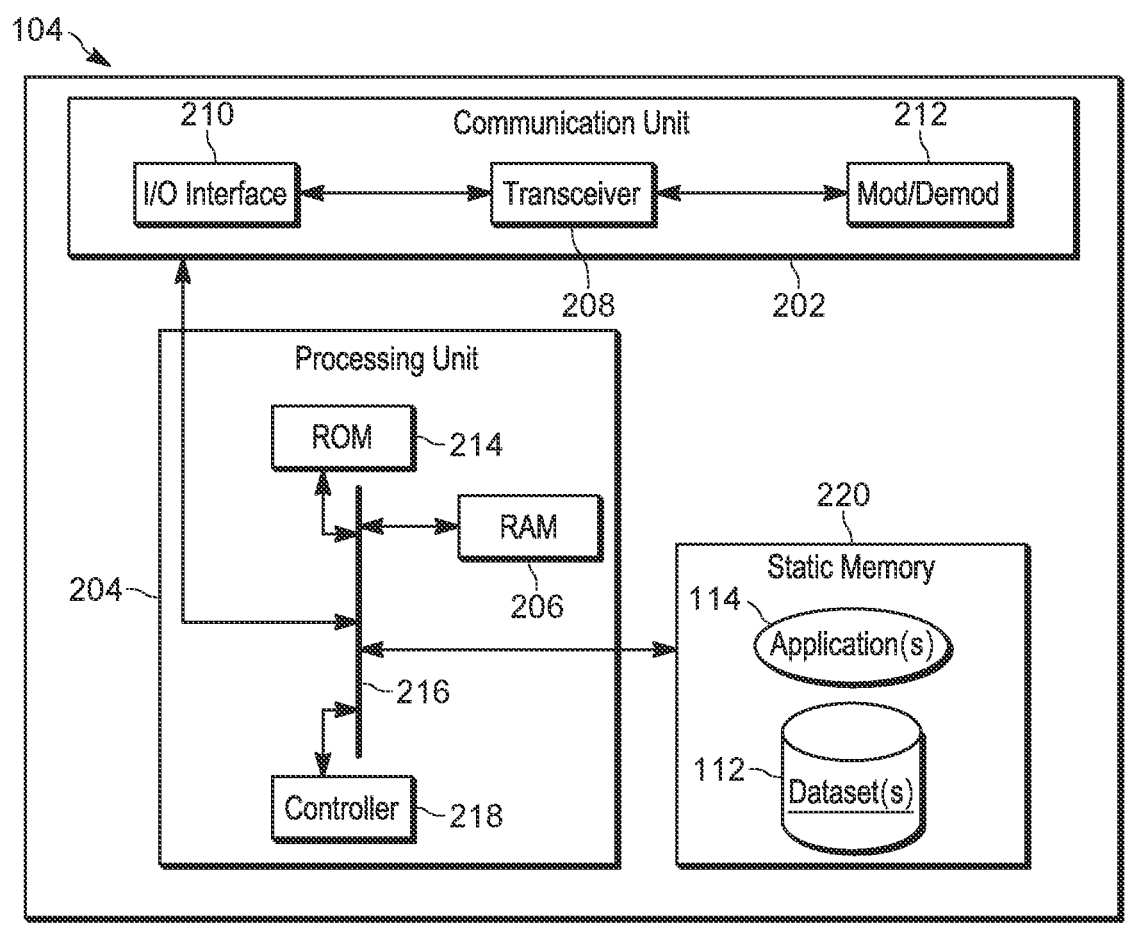
FIG. 2 is a block diagram showing the server of FIG. 1 in greater detail.

Referring now to FIG. 2, a non-limiting example of the server 104 is shown in greater detail in the form of a block diagram. While the server 104 is depicted in FIG. 2 as a single component, functionality of the server 104 may be distributed amongst a plurality of components, such as a plurality of servers and/or cloud computing devices. Indeed, the term "server" itself is not intended to be construed in a limiting sense as to the type of computing hardware that may be used.

As depicted in FIG. 2, the server 104 comprises: a communication unit 202, a processing unit 204, and static memory 220. Various sub-components of server 104 include a Random-Access Memory (RAM) 206, one or more wireless transceivers 208, one or more wired and/or wireless input/output (I/O) interfaces 210, a combined modulator/demodulator 212, a Read Only Memory (ROM) 214, a common data and address bus 216, a controller 218, and a static memory 220 storing dataset(s) 112 and application(s) 114. The controller 218 is communicatively connected to other components of the server 104 via the common data and address bus 216. Hereafter, the at least one application 114 will be interchangeably referred to as the application 114.

Furthermore, while the memories 206, 214 are depicted as having a particular structure and/or configuration, (e.g., separate RAM 206 and ROM 214), memory of the server 104 may have any suitable structure and/or configuration.

While not depicted, the server 104 may include one or more of an input device and/or output device such as a display screen, which, when present, is communicatively coupled to the controller 218.

As shown in FIG. 2, the server 104 includes the communication unit 202 communicatively coupled to the common data and address bus 216 of the processing unit 204.

The processing unit 204 may include the Read Only Memory (ROM) 214 coupled to the common data and address bus 216 for storing data for initializing system components. The processing unit 204 further includes the controller 218 being coupled by the common data and address bus 216 to the Random-Access Memory 206 and the static memory 220.

The communication unit 202 may include one or more wired and/or wireless input/output (I/O) interfaces 210 that are configurable to communicate with other components of the system 100. For example, the communication unit 202 may include one or more wired and/or wireless transceivers 208 for communicating with other components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP (3rd Generation Partnership Project) networks, a 5G network (e.g., a network architecture compliant with, for example, the 3GPP TS 23 specification series and/or anew radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

A person skilled in the art will now recognize that the communication unit 202 provides the point of connection between the server 104 and the communication devices 108 of FIG. 1. It will also now be understood that, in accordance with FIG. 1, a wireless communication link between the server 104 and the devices 108 is contemplated. With that said, the choice of wired or wireless communication links anywhere in system 100 is not specifically mandated unless required to fulfill a given function.

The processing unit 204 may include ports (e.g., hardware ports) for coupling to other suitable hardware components of the system 100. The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the processing unit 204 and/or the server 104 is not a generic controller and/or a generic device, but a device specifically configured to implement functionality for controlling one or more UAVs. For example, in some examples, the server 104 and/or the processing unit 204 specifically comprises a computational engine configured to implement functionality for controlling UAVs.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory). In the example of FIG. 2, programming instructions (e.g., machine readable instructions) that implement the functionality of the server 104 as described herein are maintained, persistently, at the memory 220 and used by the processing unit 204, which makes appropriate utilization of volatile storage during the execution of such programming instructions.

Furthermore, the memory 220 stores instructions corresponding to the at least one application 114 that, when executed by the controller 218, enables the controller 218 to implement functionality for controlling UAVs, including but not limited to, the blocks of certain methods discussed elsewhere herein. Furthermore, while the datasets 112 are shown as stored within memory 220, they can also be maintained in database servers (not shown) external to server 104. Likewise, applications 114 may be stored externally to server 104.

In illustrated examples, when the controller 218 executes the one or more applications 114, the controller 218 is configured to perform various methods including the specific methods and their variants discussed below.

Alternatively, or in addition, each application 114 may include machine learning and/or deep-learning based algorithms and/or neural networks, and the like, which can be trained to improve the UAV control approaches discussed herein. Furthermore, in these examples, each application 114 may be operated by the controller 218 in a training mode to train the machine learning and/or deep-learning based algorithms and/or neural networks of each application 114 in accordance with the teachings herein.

The one or more machine-learning algorithms and/or deep learning algorithms and/or neural networks of each application 114 may include, but are not limited to: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Bayesian inference algorithms; reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public-safety environments. However, to be clear, any suitable machine-learning algorithm and/or deep learning algorithm and/or neural network is within scope of the present specification.

Referring again to FIG. 1, while details of the devices 108 are not depicted, the devices 108, and particularly the units 120, may have components similar to the server 104 but adapted for their respective functionalities and form factor. For example, the units 120 may include respective display screens for rendering notifications and displaying images and/or respective devices and/or applications for registering a location with the server 104, and the like. As noted, the headsets 116 are input devices including a microphone for receiving voice instructions, and various output devices, such as a speaker or headset interface, for delivering voice responses. The devices 108 thus have a form factor and interfaces that make them suitable for use by firefighters, and accordingly, one device 108 is shown respective to each firefighter 110.

FIG. 1 also shows a plurality of UAVs 124. Each UAV 124 itself has a computational unit with a set of components similar to server 104, but also with its own form factor and structure that complements the form factor of the UAV 124. In other words, each computational unit within each UAV 124 has its own processing unit, memory, communication unit, peripherals and independent power supply that are configured for the mechanical and necessary control functions of the UAV 124.

It is to be understood that specific computational and storage functions, including datasets 112 and applications 114, described in relation to each of server 104, devices 108 and UAVs 124 may be implemented across different components of system 100, and the specific embodiments described herein are examples. As a particular example, UAVs 124 are described herein with limited computational resources and to act as slaves to control commands determined and issued by server 104 via units 120; and yet, in variants of system 100, UAVs 124 can include additional computational resources to permit performance of some or all of the applications 114 and/or datasets 112 to be locally resident at UAV 124.

Speaking generally, a person of skill in the art, with the benefit of this specification, will appreciate that system 100 is intended to operate in a supporting role for firefighters 110 performing their duties at a fire or other public safety incident. More specifically, UAVs 124 are configured to provide image telemetry via system 100, so as to allow the server 104 and the devices 108 to use the remaining computing resources of system 100 for other functions thus overall improving optimization of the computing resources of system 100.

To further assist in understanding system 100, reference will now be made to FIG. 3, which shows a flowchart indicated generally at 300 depicting a method for controlling a UAV in a shadow mode. Hereafter, the flowchart will be referred to as method 300, and this nomenclature will apply to other methods and flowcharts discussed herein. Method 300 can be implemented on system 100, but it is to be understood that method 300 can also be implemented on variations of system 100, and likewise, method 300 itself can be modified and operate on system 100. It is to be understood that the blocks in method 300 need not be performed in the exact sequence shown and that some blocks may execute in parallel with other blocks, and method 300 itself may execute in parallel with other methods. Additional methods discussed herein in relation to system 100 are subject to the same non-limiting interpretation.

For illustrative convenience, method 300 will now be discussed in relation to system 100, and the integration of method 300 into system 100 is represented by the inclusion of application 114-1 in FIG. 3, indicating that method 300 is implemented as application 114-1 in FIG. 1. Thus, method 300 and application 114-1 may be referred to interchangeably, and this convention will also apply elsewhere in this specification.

In a general sense, method 300 and application 114-1 represent a shadow mode, whereby a given UAV is configured to shadow the movements of a given firefighter. In system 100, when operating in shadow mode according to method 300, each UAV 124 will track the movements of a respective firefighter 110 and capture and relay image data to server 104. There are many ways to implement application 114-1 itself, and of particular note, application 114-1 may be implemented, substantially or in part, within the computational resources inside each UAV 124, or, substantially or in part, inside the computational resources of a respective device 108. In the present example, however, application 114-1 is implemented inside server 104 and thus multiple instances of application 114-1 can execute inside server 104 to control different respective UAVs 124. According to this example, the computational resources inside UAV 124 are minimal while the core computational functions of method 300/application 114-1 are substantially offloaded to the server 104, establishing a slave relationship to the server 104.

Figure 3:
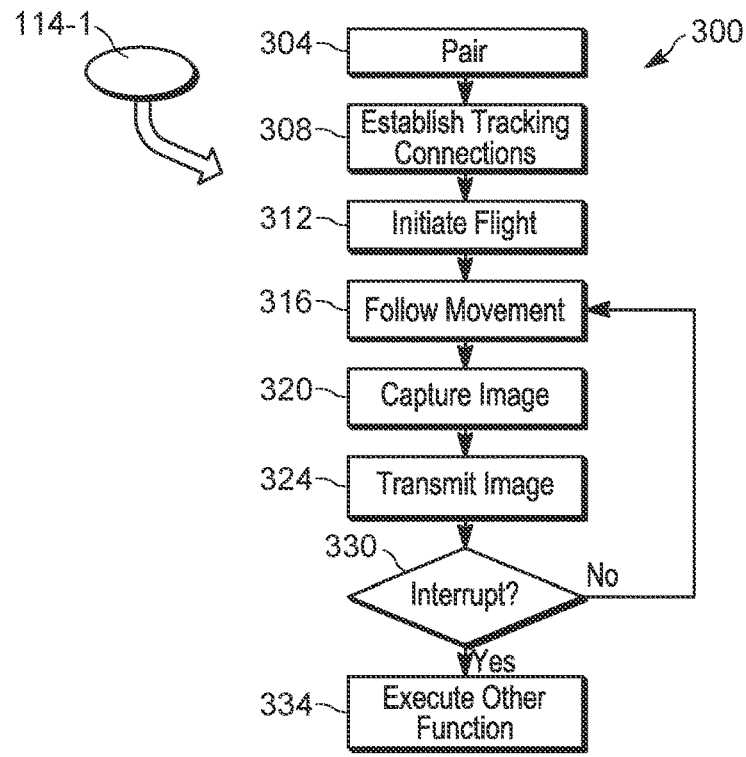
FIG. 3 is a flow chart depicting a method of controlling a UAV in a shadow mode.

Referring now to FIG. 3, at block 304, a pairing function is effected. Such a pairing function establishes a communication association between a UAV 124 and its respective communication device 108 and/or firefighter 110. The means by which such pairing is effected is not particularly limited, but as an illustrative example, can include initializing the UAV 124 and providing an express communication identifier (e.g. a MAC address, IP address) of a device 108 and thereby establishing a communication link that pairs the UAV 124 with the communication device 108. Alternatively, or in addition, a firefighter 110 may wear a visual identifier on her personal protective equipment ("PPE") or "bunker gear" that the camera within a UAV 124 is configured to image-capture and the processing unit within UAV 124 configured to recognize. Other means of effecting a pairing between a given UAV 124 and a given communication device 108 and/or firefighter 110 will now occur to those skilled in the art. (It is to be understood that in variants of system 100, the concept of pairing at block 304 need not be construed in a limiting fashion, as server 104 can be configured to dynamically change which UAV 124 is associated with a given firefighter 110, or indeed, in a subsequent embodiment discussing "freelancing mode" where a given UAV 124 need not have any specific pairing with a given firefighter 110 at all but simply performs tasks assigned by server 104.)

At block 308, tracking connections are established. Such tracking connections are to establish the sensory communications between the movements of the firefighter 110 and its respective UAV 124, such that the UAV 124 can be controlled to follow the movements of the firefighter 110 using location data in device 108 and/or artificial intelligence image processing to visually identify firefighter 110 and issue controls to cause the UAV 124 to follow the movements of the firefighter 110. If desired, as an enhancement, enhanced tracking connections can be employed to also follow the head and/or eye movements of the firefighter 110 so that the camera in the UAV 124 is capturing images of objects that are also being seen by the firefighter 110. In a simple enhanced configuration, the UAV 124 may use artificial intelligence image processing so as to identify the front and back of the firefighter 110, so that it can orient its camera in the same direction as the front of the firefighter 110. In more complex configurations, headset 116 can be augmented with tracking sensors such as those employed in certain commercially available virtual reality headsets. By the same token, UAV 124 can be equipped with one or more omni-directional cameras and thereby obviate or mitigate the need for direction tracking. The person of skill in the art will now appreciate other means of establishing tracking connections.

At block 312, flight of the UAV is initiated. Thus at block 312, the propulsion system of the UAV 124 is activated and according to block 316, propulsion and directional control commands are issued to the UAV 124, instructing the UAV 124 to follow the movements of firefighter 110 according to the pairing and tracking connections established in block 304 and block 308 respectively. At block 320, images are captured by the camera system of the UAV 124 according to the tracking technology as per block 308. At block 324, images captured at block 320 are transmitted to server 104 for storage, analytics, relaying and/or display on, for example, the display within one more units 120, such as unit 120-S so that fire chief 118 can monitor the visual experience of the firefighter 110 respective to the UAV 124. In this manner, fire chief 118 can understand the experiences of the firefighters 110 and issue command instructions to the firefighters with the view towards resolving the PSI.

At block 330, a decision is made as to whether to interrupt the performance of method 300. A "no" decision, meaning that method 300 is to continue, results in a return to performance of block 316, block 320 and block 324 so that the UAV 124 continues to follow the firefighter 110 and relay images to server 104 as described above. (Collectively, block 320 and block 324 may be considered the performance of one type of "task" that can be performed by a UAV 124 and such a "task" may optionally be considered to include a given location or movement pattern from block 316.)

A "yes" decision at block 330 leads to block 334, which broadly encompasses the option to execute another function.

The other function at block 334 could simply be a power-down command to the UAV 124, thereby terminating operation of UAV 124 altogether, preceded by a graceful return and landing of the UAV 124. Block 334 contemplates that one or more other functions could be invoked, and which function(s) is(are) invoked can be managed by having more complex decision criteria at block 330.

The other function at block 334 can also be another operating mode of UAV 124 that either executes in lieu of method 300 or in parallel with method 300. Recall that method 300 is a shadow mode whereby UAV 124 follows firefighter 110, but other modes can include a variety of other functions such as picking up objects, taking gas or temperature readings if so equipped, or assumption of pure manual control over the UAV 124 by a device 108 or the like.

Figure 4:
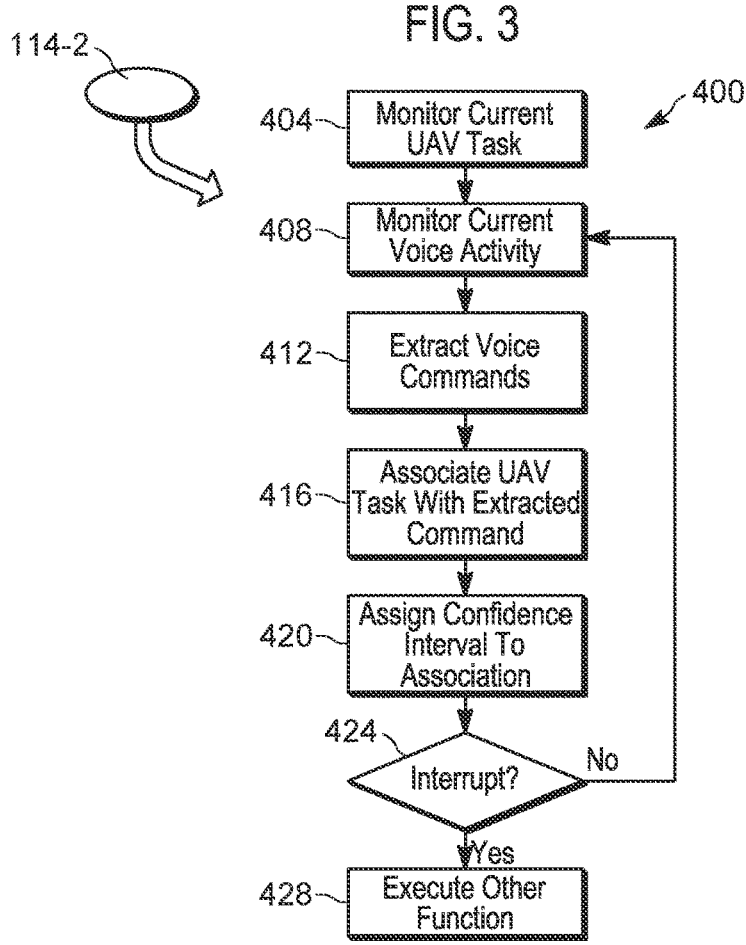
FIG. 4 is a flow chart depicting a method of monitoring a UAV in a learning mode.

In the present specification, one contemplated function that can run parallel to method 300 is a learning mode, which is discussed in greater detail in FIG. 4 in relation to method 400. In a general sense, the learning mode contemplates monitoring voice activity that is captured simultaneously, or temporally relative to, the specific "task" being performed at, for example, block 316, block 320 and block 324.

Referring now to FIG. 4, block 404 comprises monitoring the current task. As noted above, a "task" can comprise any activity that is being performed by the UAV at the time of performance of block 404. As noted above, a "task" can be deemed to be the capturing and transmission of images by the camera of the UAV 124, i.e. what is occurring at block 320 and block 324 in association with a given location or movement pattern for the UAV 124. In variants, tasks can refer to any function being performed by the UAV 124, such as moving from one location to another, performing a grasping or releasing of an object, performing a gas or temperature sensor reading or any other task that can be performed by a UAV according to the UAV's features and functions. "Task" should be construed broadly.

At block 408, current voice activity is monitored. Block 408 contemplates that voice activity received at a given headset 116 is monitored. In a simple case, the headset 116 respective to a given UAV 124 is monitored in order to eventually extract voice commands from the voice activity that coincide with a current UAV task. In more complex cases all headsets 116 are monitored, and specifically the headset 116-S belonging to fire chief 118, to develop more complex models of extracted voice commands associated with UAV tasks. The simple case will be discussed in greater detail below and a person of skill in the art will therefore come to appreciate the more complex cases and scaling. The voice activity from block 408 is essentially raw data that is stored in a voice-activity dataset 112-1 for further analysis.

At block 412, voice commands suitable for controlling UAV 124 are extracted from the voice activity monitored at block 408. Block 412 can be effected by known natural language processing (NLP) techniques or human machine learning training or a combination of both. Phrases such as "Show me the other side of the building", "Show me the opposite corner", "What's behind the wall?" or "Show me the view from the end of the street" would be extracted from the voice-activity dataset 112-1 and stored in a voice-command dataset 112-2. On the other hand, voice activity such as "My air tank is full" or "Start connecting hoses to the second pumper truck" would be ignored as being irrelevant for controlling the UAV.

At block 416, a UAV task is associated with an appropriate extracted voice command. Block 412 can be effected by a simple temporal association between the time when a given UAV task was being performed and an extracted voice command from block 412. Thus, for example, if the voice command "Show me the rear of the building" was extracted from voice communications originating from headset 116-S operated by fire chief 118, and within a subsequent time interval firefighter 110-1 walks to the rear of a building while method 300 is controlling UAV 124-1, and firefighter 110-1 issues a response message "I am at the rear of the building and looking at it", then the specific UAV task encompassed by the movement performed at block 316, the image capture performed at block 320 and the image transmission performed at block 324, can be associated with the voice command "Show me the rear of the building". At this point, this combination of the extracted voice command and the task can be associated and stored in a command-task dataset 112-3 for future use.

(As will be elaborated below in relation to freelancing mode in FIG. 6, at this point a person of skill in the art will begin to recognize that, as a result of the teachings in this specification, each UAV 124 can be dynamically assigned one, or more, learned tasks stored in dataset 112-3, and each task can be associated with different types of public safety incidents. Thus, in the freelancing mode to be discussed below, a given UAV 124 can also be configured to execute a given "action" task automatically when it associates the current situation with a related "monitor" task. For example, when a UAV 124 is controlled so as to "Monitor the rear of the building" during a fire public safety incident, the UAV 124 will periodically send video of the rear of the building. In a police crime scene, when the UAV 124 is assigned a task corresponding to "Monitor the back of the parking garage", then the UAV 124 can be controlled so as to send an audio alert and video whenever a car exits the garage. In a search and rescue incident, the command "Monitor the trail entrance" can result in the UAV 124 being configured to deliver an audio alert, a video feed, and/or a thermal image whenever a person is detected at the trail entrance. Again, these aspects of the specification will become more apparent from the following discussions below.)

Referring again to FIG. 4, at block 420 a confidence interval is assigned to the command and task association from block 416. This can be part of a machine learning training exercise that is done manually by a human reviewing the image feeds and providing an affirmation that the command and task were correctly associated. Alternatively, or in addition, the machine learning can also be automated based on a voice response message such as "I am at the rear of the building and looking at it" can be considered part of a machine learning training set that assigns an affirmative confirmation that the command was correctly associated with the task.

Referring again to FIG. 4, block 424 contemplates an interrupt decision, where a "no" determination results in continued training of associating voice commands with UAV tasks as described above, or a "yes" determination leads to block 428 at which point another function can be executed. The criteria for block 424 is not particularly limited and is left to a person skill in the art having the benefit of this specification to consider a full range possibilities according to the context in which system 100 may be operated, but a concrete example would be the issuance of an express command that the tasks being performed by UAV 124 are complete and further training under method 400 is not presently required. The other functions that can be performed at block 428 are not particularly limited but could include terminating method 400 and invoking method 500 in FIG. 6, or continuing to perform method 300, method 400 and/or alternating method 300 with performance of method 500 in FIG. 6.

Figure 5:
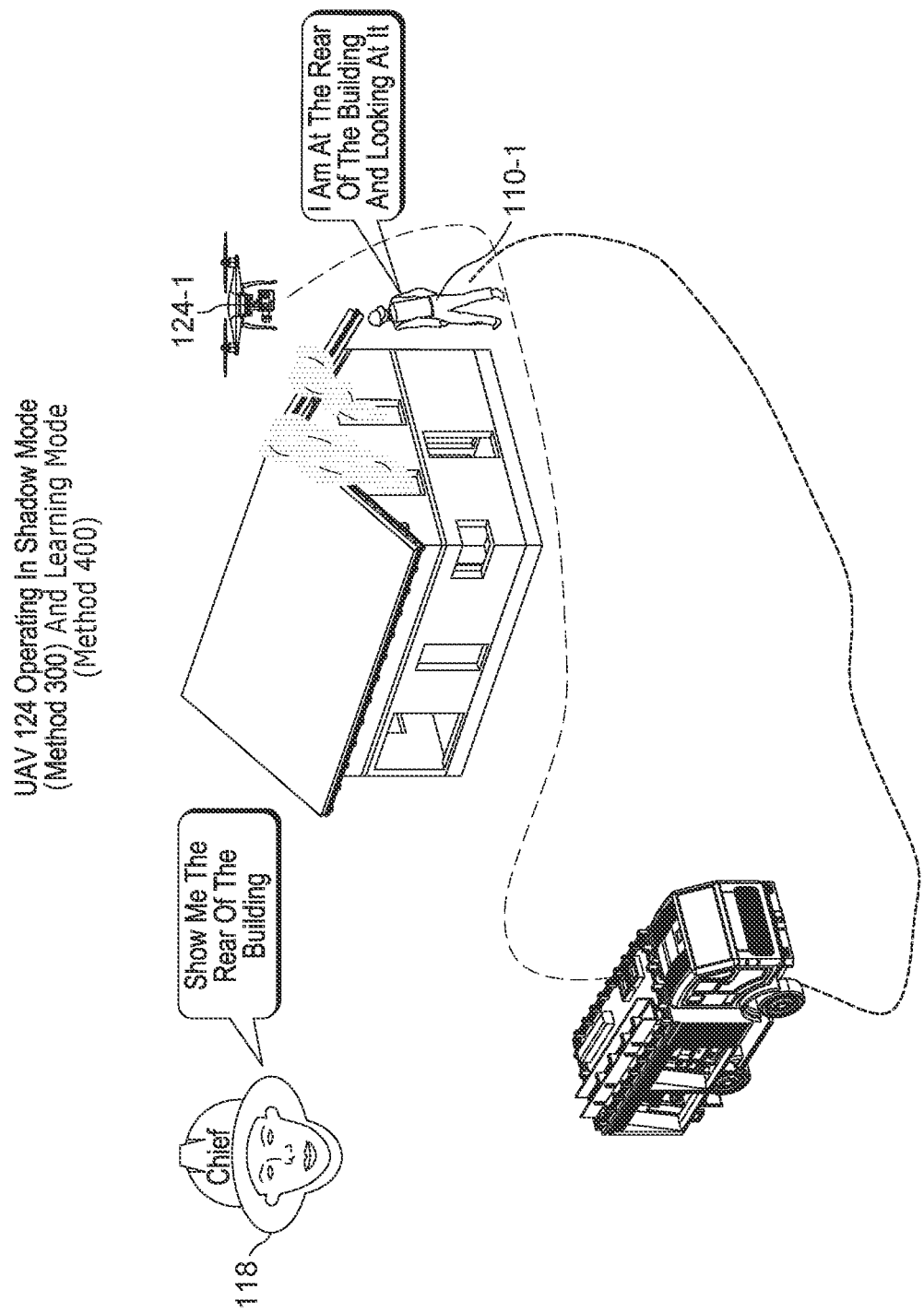
FIG. 5 is a graphical representation of a UAV at a public safety incident in the shadow mode of FIG. 3 and the learning mode of FIG. 4.

To provide further illustration of the parallel performance of method 300 and method 400, FIG. 5 shows a graphic. The graphic provides a visual of the firefighter 110-1 and UAV 124-1 operating in shadow mode according to method 300 and whereby the functions being performed by UAV 124-1 are being captured as a discrete task according to method 400 and associated with extracted voice commands, in order to build the command-task dataset 112-3.

Figure 6:
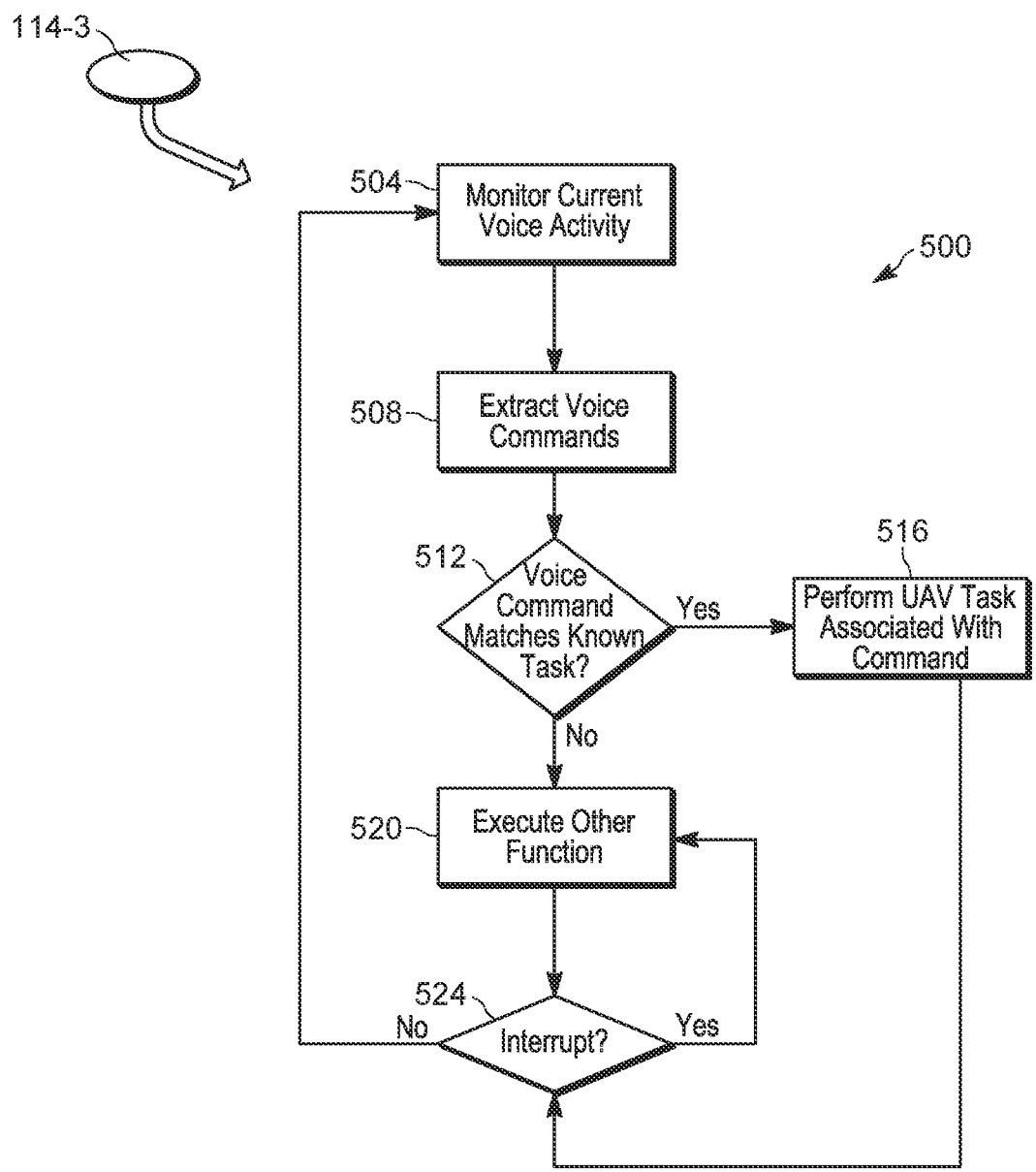
FIG. 6 is a flow chart depicting a method of controlling a UAV in a freelance mode.

Referring now to FIG. 6, a method 500 (which corresponds to application 114-3) is shown for controlling a UAV in a freelancing mode, whereby a given UAV 124 is controlled based on extracted voice commands from its respective headset 116 or another headset within system 100. Freelancing mode becomes available for controlling a UAV after a machine learning training exercise has been conducted using method 400 or the like. In a general sense, when operating in freelancing mode according to method 500, a UAV 124 will be controlled when an extracted voice command matches a known task stored in the command-task dataset 112-3. Again, there are many ways to implement application 114-3 itself, and of particular note, application 114-3 may be implemented, substantially or in part, within the computational resources inside each UAV 124, or, substantially or in part, inside the computational resources of a respective device 108. In the present example, however, application 114-3 is implemented inside server 104 and thus multiple instances of application 114-3 can execute inside server 104 to control different respective UAVs 124. According to this example, the computational resources inside UAV 124 are minimal while the core computational functions of method 500/application 114-3 are substantially offloaded to the server 104, establishing a slave relationship with the server 104.

It should be noted that, for illustrative simplicity, method 500 omits reproducing the pairing, tracking and flight initiation blocks from method 300 (i.e. block 304, block 308 and block 312). However a person of skill in the art will appreciate that those blocks are assumed to have been performed before block 504. Also, the same comments made regarding the other methods regarding the possibility of parallel block performance and/or different order of block performance apply to method 500.

At block 504 voice activity is monitored. Block 504 is substantially equivalent to block 408 of method 400, except modified as desired for the context of method 500. Likewise, block 508 comprises extraction of voice commands from the voice activity monitored at block 504 and therefore block 508 is substantially equivalent to block 412 of method 400. At block 512, a determination is made as to whether any voice commands extracted at block 508 match a known voice command that is associated with a known task. In the non-limiting example of system 100, block 512 is effected by examining command-task dataset 112-3.

Based on the specific example from the discussion of method 400, a person of skill in the art will now appreciate that, at block 512, if an extracted voice command matches "Show me the rear of the building", then a corresponding task will be available in dataset 112-3, as recorded during a previous PSI, based on the UAV movements and camera capturing shown and previously discussed in relation to FIG. 5. Thus, in this example, a "yes" determination will be made at block 512, leading to block 516.

At block 516, the UAV task found in command-task dataset 112-3 that matched the extracted voice command from block 508 is automatically performed by server 104 (or other component of system 100) issuing control commands to UAV 124-1 to cause UAV 124-1 to perform the same task that was shown and discussed in relation to FIG. 5. Specifically, as illustrated in FIG. 7, UAV 124-1 is controlled without shadowing firefighter 110-1 and instead is controlled to move towards the rear of the building and to provide images of the rear of the building to server 104 for use in whatever fashion is desired for managing the PSI.

It is to be emphasized that the specific example in FIG. 7 is both a contemplated example for actual implementation and yet is also a simplified example. At the end of the discussion of method 500, many complex enhancements to method 500 are discussed. However, to briefly illustrate an example of a complex enhancement, it is contemplated that block 516 can include the combining and/or prioritization of performance of several tasks in association with a plurality of voice commands that are extracted at block 508. For example, if, at block 508, two commands are extracted, such as "Enter shadow mode for firefighter 110-2" and "Monitor of the rear of the building", then at block 516, UAV 124 can be controlled so as to choose a route between the rear of the building and the location of firefighter 110-2 so that during flight towards firefighter 110-2, the UAV 124 will pass by the rear of the building to capture one last sweep. Alternatively, if UAV 124 has a 360 degree camera, or multiple cameras, the UAV 124 can attempt to monitor both the building and shadow firefighter 110-2 as long as the location of firefighter 110-2 allows the cameras of UAV 124 to also continue monitoring the rear of the building. Where a combination of the tasks is not possible, then the UAV 124 can be controlled to prioritize, for example, the shadow command over the monitor command. In this context, a skilled person will understand that block 512 is thereby enhanced to consider whether "Voice commands match more than one known task?". At this point a further determination is made as to whether those known tasks can be combined, or if a priority should be assigned as to which known task should be performed first, or if the tasks can be performed in parallel.

Returning to our simple example, however, if, at block 512 the extracted voice commands at block 508 do not match any known tasks, then a "No" determination is made at block 512 and block 520 is invoked. Block 520 comprises executing another function, and again, the type of function is not particularly limited, but may include reverting control of the UAV 124 to the shadow mode as previously discussed in relation to method 300. However, other functions can be invoked here according to the desired implementation of system 100, such as shutting down the UAV 124, or, maintaining UAV 124 in a hovering state on standby and simply advancing to block 524.

At block 524, an interrupt determination is made, similar to the interrupt determination from block 330 or the interrupt determination from block 424. A "yes" determination leads to block 520, while a "no" determination returns method 500 to block 504.

Persons skilled in the art will also now appreciate that frequent and dynamic updating of datasets 112 bolsters the accuracy of command-task associations within system 100, thereby increasing confidence in the success of effecting the desired control of UAV 124 in freelancing mode. Thus, constant monitoring of voice commands over headsets 116 and tasks performed by UAV 124, coupled with applications that constantly assess associations between those commands and tasks, can lead to increased confidence intervals in the accuracy of the datasets 112 and accompanying freelancing UAV activity of method 500. Additionally, firefighters 110 or other individuals may periodically manually affirm or deny the accuracy of the determinations made at block 512 by studying captured voice commands and comparing them with UAV tasks that have been performed in shadow mode under method 300. These affirmations or denials can be fed back into datasets 112, particularly the confidence interval data (which may also be referred to as weightings or relationship weightings) such that the command-task associations are sufficient or "good enough", thereby increasing the quality of datasets 112 and future determinations made at block 512. Accordingly, persons skilled in the art will now also appreciate the novel machine learning aspect of the present specification. Indeed, one or more machine-learning algorithms for implementing a machine-learning feedback loop for training the one or more machine-learning algorithms may be provided, where the machine-learning feedback loop comprises processing feedback indicative of an evaluation of confidence intervals maintained within datasets 112 to as determined by the one or more machine-learning algorithms.

Indeed, confidence intervals may be provided as a training set of feedback for training the one or more machine-learning algorithms to better determine these command-task relationships. Such a training set may further include factors that lead to such determinations, including, but not limited to, manually affirming or denying "yes" determinations made at block 512. Such a training set may be used to initially train the one or more machine learning algorithms.

Further, one or more later determined confidence intervals may be labelled to indicate whether the later determined confidence intervals, as generated by the one or more machine-learning algorithms, represent positive (e.g., effective or "good enough") examples or negative (e.g., ineffective) examples.

For example, the one or more machine-learning algorithms may generate confidence intervals, to indicate higher or lower levels of respective confidence in correctly associating a given voice command with a given task.

Regardless, when confidence intervals in datasets 112 are provided to one or more machine-learning algorithms in the machine-learning feedback loop, the one or more machine-learning algorithms may be better trained to determine future confidence intervals.

In other examples, confidence intervals generated by one or more machine-learning algorithms may be provided to a feedback computing device (not depicted), which may be a component of the system 100 and/or external to the system 100 that has been specifically trained to assess accuracy of "yes" determinations made at block 512. Such a feedback computing device may generate its own confidence intervals as feedback (and/or at least a portion of the feedback) back to the server 104 for storage (e.g., at the memory 220) until a machine-learning feedback loop is implemented. Put another way, confidence intervals for command-task associations via a machine learning algorithm may be generated and/or provided in any suitable manner and/or by any suitable computing device and/or communication device.

Hence, by implementing a machine-learning feedback loop, more efficient operation of server 104 may be achieved, and/or a change in operation of the server 104 may be achieved, as one or more machine-learning algorithms are trained to better and/or more efficiently determine the confidence intervals in datasets 112.

Persons of skill in the art will now appreciate that system 100 and related datasets 112 and applications 114 can be scaled and that combinations, subsets and variations are contemplated. The present specification generally provides a system which is used to communicate between human users at a public safety incident that contemplates monitoring the voice communications between the human users on the system and which uses audio and voice analytics to decode commands for human users. The UAV can learn the intent of these commands from previous incidents and apply that intent during a current incident.

Several additional possible enhancements to system 100 are contemplated:

1) The UAV 124 is configured to stream video of operations from various areas of the incident as those areas are mentioned over the voice channels of system 100.

2) If multiple areas of the PSI are mentioned, the UAV 124 may alternate between them or include all views in a wider angle.

3) Audio captions in the form of text may be added to the captured video which is analyzed and annotated to indicate what audio is not synchronized with a task and to indicate why and when the actual task is being performed. This may happen when UAV task performance is delayed due to UAV travel time or due to another task having a higher priority, all of which can be part of the machine learning training discussed above.

4) The UAV controls may be learned from previous PSI such as fires such that that the first fire unit arriving can visualize the structure from all sides as a secondary size-up to better understand the PSI, so when system 100 is fully trained, the UAV performs this task without human prompting upon arrival at a structure fire or other PSI.

5) The system 100 will interpret "monitor" commands as: provide video and sensor data of an area periodically. Such as: "monitor the rear of the structure"

6) The system 100 is trained to discern which commands the UAV can perform or augment and automatically provides supporting video or other sensor data to support human users, actions and commentary. For example, a UAV that cannot enter a structure without its own destruction or damage will ignore commands intended for interior crews but the UAV can still stream video of an exterior in the vicinity of interior crew. In this way, system 100 is configured to filter out certain commands from other commands.

7) The system 100 will determine which data to send for action based on: user role and incident size. For example: video can go to the fire chief or other incident commander while a short verbal description of the video can be sent as update to all users.

8) The system 100 can be configured so that captured images only intended for a specific subset of firefighters 110 or fire chief 118 are delivered to them. For example, images captured by UAV 124-1 may be only delivered by server 104 to unit 120-S and unit 120-1, but not delivered to the remaining units 120.

Further enhancements include a method for combining tasks associated with voice commands and UAVs 124 at a given PSI. For example, system 100 can be configured to have different incident types associated with different tasks maintained in datasets 112. On this basis, system 100 can be configured so that a given UAV 124 can begin performing pre-defined tasks that are based on incident type. Incident types can include a fire, a burglary, a vehicle collision, a shooting, an act of terrorism or a search and rescue mission. Other incident types will occur to those skilled in the art.

Method 300 can also be scaled or modified so that different or additional datasets 112 are assigned to different firefighters 110. Thus, the shadow function of method 300 and learning function of method 400 as performed in relation to firefighter 110-1 may create a command-task dataset 112-3 that is different from the command-task datasets 112-3 that would be created in relation to each other firefighter 110-2 . . . 110-n. Associations between a given firefighter 110, the tasks they perform and their voice commands can be based on an aerial survey to identify personnel using image recognition or based on their unique radio ID associated with their unit 120. Firefighters 110 and other personnel can be identified via a dataset 112 including via attributes such as location, rank, time on scene or order of arrival.

The freelance mode of method 500 can be enhanced such that as multiple voice commands are extracted, performance of tasks associated with those commands are prioritized based on, for example:

1) Urgency of request based on machine learning that detects stress levels in voice
2) Urgency of request determined by keywords
3) Ability to combine a given task with other tasks
4) An affirmative command indicating priority request
5) Role/rank of firefighter 110 or fire chief 118 or other personnel
6) Time sensitive requests, such as obtaining a reading of gas levels that may predict an imminent explosion
7) Current location and capabilities of UAVs
8) Prioritizing tasks for the shortest path between the UAV 124 and the task location
9) Prioritization levels based on learned tasks from previous incidents The freelance mode of method 500 can be enhanced by training such that as multiple voice commands are extracted, performance of tasks associated with those commands may, in addition or instead of being prioritized, the system 100 can be configured to determine which requests can be combined based by taking into account: 1) weighting factors as defined in the datasets 112 relating to the source of the voice command; 2) content of the voice command; 3) context of voice command such as location; 4) tasks with similar priority level and 5) establishing an overall priority of a combined set of tasks.

The freelance mode of method 500 can be enhanced by location awareness, by understanding the physical location where a voice command originated, and the analysis of one or more similar voice commands from a nearby location.

In other variations, other inputs from the firefighters can be used other than voice commands, such as body gestures or direct input into units 120.

As will now be apparent from this detailed description, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, cannot control a display screen, cannot implement a machine learning algorithm, nor implement a machine learning algorithm feedback loop, and the like).

In the foregoing specification, specific embodiments have been described. However, one of ordinary skill in the art will now appreciate that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. Furthermore, references to specific percentages should be construed as being "about" the specified percentage.

A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, embodiments can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication system, comprising:
   a plurality of radio voice communication devices for performing transmission and reception of first responder voice communications during a current public safety incident;
   an unmanned aerial vehicle (UAV) having an integrated communication device for monitoring the voice communications; and
   a processing unit for controlling the UAV and providing audio and voice analytics to detect and learn voice commands and associate the learned voice commands with UAV tasks assigned during the current public safety incident, the learned voice commands and associated UAV tasks for the current public safety incident being processed for predictive analytics for automated control of the UAV at future public safety incident using voice commands detected at the future incident,
   wherein the processing unit is further configured to:
   control the UAV to enter a shadow mode;

pair the UAV, in the shadow mode, with one or more of a first responder and a radio voice communication device associated with the first responder;

control the UAV, in the shadow mode, to track movements of the first responder, whereby functions being performed by the UAV while tracking the movements of the first responder are captured as a discrete UAV task, the functions comprising one or more of propulsion commands and directional control commands;

receive, while the UAV is in the shadow mode, a voice command provided to the radio voice communication device associated with the first responder;

associate the voice command with the one or more of the propulsion commands and directional control commands;

save, as the discrete UAV task, at a memory, the voice command in association with the one or more of the propulsion commands and the directional control commands;

after the discrete UAV task is saved at the memory, control the UAV to enter a freelance mode;

monitor, while the UAV is in the freelance mode, the first responder voice communications; and when the voice command is detected in the first responder voice communications, control the UAV to execute the one or more of the propulsion commands and the directional control commands.

2. The communication system of claim 1 wherein the predictive analytics including weighting the UAV tasks and combining UAV tasks that can be performed together and updating the weighting in response to future incident UAV responses.

3. The communication system of claim 1 wherein the processing unit further performs a radio frequency (RF) survey via the UAV communication device to identify personnel based on their unique radio ID and associate public safety (PS) commands with UAV tasks associated with the identified personnel and incident type.

4. The communication system of claim 1 wherein the UAV streams video of operations from a plurality of areas of the incident in conjunction with detected first responder voice commands.

5. The communication system of claim 1 wherein the processing unit adds captions to UAV video that is not synced with the first responder voice command to identify potential anomalies.

6. The communication system of claim 1 wherein the processing unit detects the voice command at a future incident and augments UAV tasks based on the detected command.

7. The communication system of claim 1 wherein the processing unit detects a location by understanding a physical location where the voice command originated and assessing a similar voice command from a nearby location.

8. The communication system of claim 1 wherein the processing unit further filters out commands that it cannot perform and substitutes a task that the UAV can perform related to the commands.

9. The communication system of claim 1, wherein UAV acquired data is transferred to first responders based on first responder role and incident parameter.

10. A method for controlling a UAV at a public safety incident, comprising:

deploying, via a processing unit, a UAV at an incident scene, the UAV performing pre-defined tasks based on incident type;

building, via the processing unit, a dataset of UAV tasks based on detected voice commands and incident type;

performing, via the processing unit, predictive analytics on the UAV tasks for application at a future incident using the dataset;

weighting and combining, via the processing unit, UAV tasks based on predetermined parameters; and automatically controlling the UAV to perform predicted tasks at the future incident based on incident type, wherein the method further comprises:
controlling, via the processing unit, the UAV to enter a shadow mode;

pairing, via the processing unit, the UAV, in the shadow mode, with one or more of a first responder and a radio voice communication device associated with the first responder;

controlling, via the processing unit, the UAV, in the shadow mode, to track movements of the first responder, whereby functions being performed by the UAV while tracking the movements of the first responder are captured as a discrete UAV task, the functions comprising one or more of propulsion commands and directional control commands;

receiving, via the processing unit, while the UAV is in the shadow mode, a voice command provided to the radio voice communication device associated with the first responder;

associating, via the processing unit, the voice command with the one or more of the propulsion commands and directional control commands;

saving, via the processing unit, as the discrete UAV task, at a memory, the voice command in association with the one or more of the propulsion commands and the directional control commands;

after the discrete UAV task is saved at the memory, controlling, via the processing unit, the UAV to enter a freelance mode;

monitoring, via the processing unit, while the UAV is in the freelance mode, the first responder voice communications; and when the voice command is detected in the first responder voice communications, controlling, via the processing unit, the UAV to execute the one or more of the propulsion commands and the directional control commands.

11. The method of claim 10, further comprising:
detecting the voice command at a future incident; and
automatically controlling UAV tasks based on the detected command.

12. The method of claim 10 further comprising:
filtering out voice commands that the UAV cannot perform; and
substituting a task that the UAV can perform related to the voice commands.

13. The method of claim 10 further comprising performing a radio frequency (RF) survey via a UAV communication device to identify personnel based on their unique radio ID and associate public safety (PS) commands with UAV tasks associated with the identified personnel and incident type.

14. The method of claim 10 further comprising streaming video of operations from a plurality of areas of the incident in conjunction with detected first responder voice commands.

15. The method of claim 10 further comprising adding captions to UAV video that is not synced with a first responder voice command to identify potential anomalies.

16. The method of claim 10 further comprising detecting the voice command at a future incident and augments UAV tasks based on the detected command.

17. The method of claim 10 further comprising detecting a location by understanding physical location where the voice command originated and assessing similar voice command from a nearby location.

18. The method of claim 10 further comprising filtering out commands cannot be performed by the UAV and substitutes a task that the UAV can perform related to the commands.

19. The method of claim 10 further comprising transferring UAV data to first responders based on first responder role and incident parameter.

20. The method of claim 10 further comprising using a machine learning system to perform the weighting and combining.

* * * * *